Reissue No. 349

Charles W. Brown's tonguing and grooving machine.

Reissued Feb. 5. #7856.

Witnesses
Fred'k Gavett
Chas. A. Pepin

Charles W. Brown.

UNITED STATES PATENT OFFICE.

CHARLES W. BROWN, OF BOSTON, MASSACHUSETTS.

IMPROVED TONGUING AND GROOVING MACHINE.

Specification forming part of Letters Patent No. 3,794, dated August 14, 1844; Reissue No. 349, dated February 5, 1856.

*To all whom it may concern:*

Be it known that I, CHARLES W. BROWN, of Boston, in the county of Suffolk and State of Massachusetts, have invented a new and useful Improvement in the Tonguing and Grooving Apparatus of Planing-Machines; and I do hereby declare that the following description, taken in connection with the accompanying drawings, hereinafter referred to, forms a full and exact specification of the same, wherein I have set forth the nature and principles of my said improvement, by which my invention may be distinguished from others of a similar class, together with such parts or combinations as I claim and desire to have secured to me by Letters Patent.

My improvement has for its object and purpose the tonguing and grooving of boards of various widths, and superseding the necessity of an adjustment of one of the cutting-tools for each board that is to be operated upon. It is peculiarly adapted to the tonguing and grooving of boards of a tapering or irregular shape, and this constitutes the great merit of my invention, as the only requisite preparation of the board before its introduction to the machine is the making of one edge straight.

In the use of the machines which have heretofore been contrived for tonguing and grooving boards, &c., it has been necessary, prior to passing them through the machine, to sort or arrange the boards of equal widths in piles, and, where the boards were of an irregular shape, to saw or reduce them to an equal or even width throughout. This, it will readily be seen, necessarily involved the waste of a considerable quantity of stock, and, where the boards were of different widths, required the adjustment of the movable tool for each board, whereas by my improvement, in which the said tool is self-adjusting, both of these objectionable necessities are effectually obviated.

Figure 1:
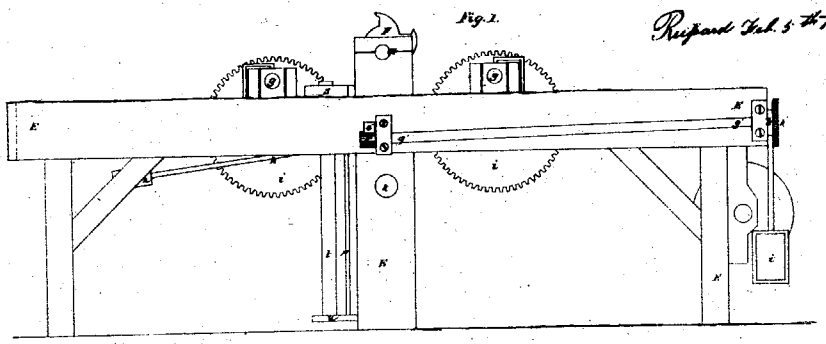
Figure 4:
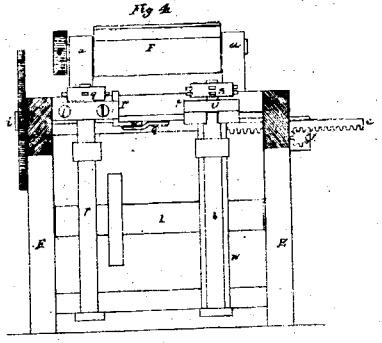
Figure 2:
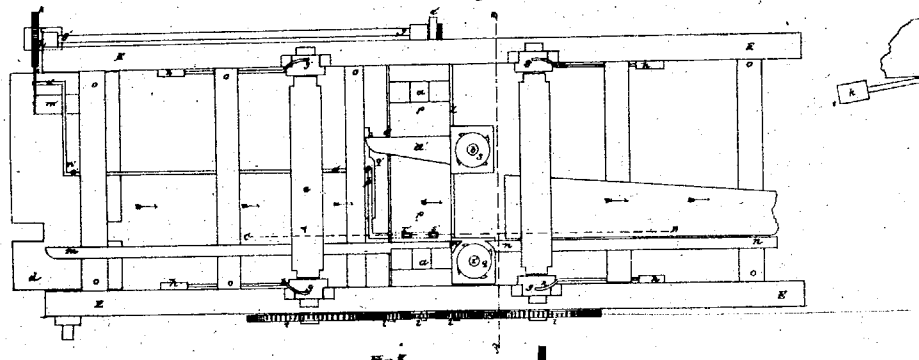
Figure 5:
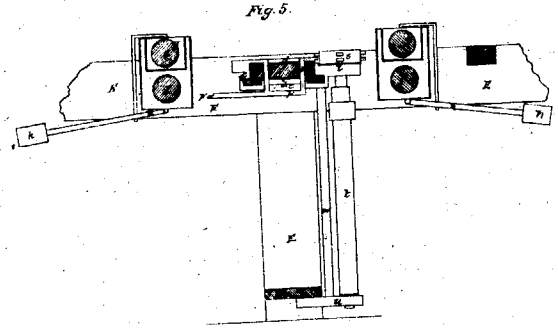
Figure 3:
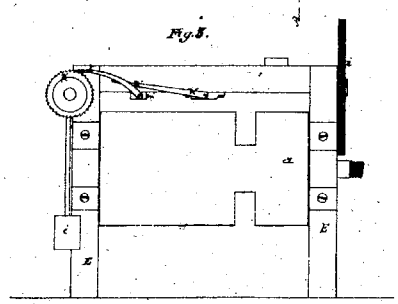

The figures of the accompanying plate of drawings represent my improvement. Figure 1 is a side elevation of a planing, tonguing, and grooving machine. Fig. 2 is a plan with the planing tool or cylinder removed for the better exhibition of the parts beneath the same. Fig. 3 is an end view. Fig. 4 is a transverse vertical section taken in the plane of the line A B, Fig. 2; and Fig. 5 is a detail longitudinal vertical section taken in the plane of the line C D, Fig. 2.

The planing-machine with which I have combined my improvements, and which is represented in the drawings, is that familiarly known as the "Woodworth planing-machine," although my said improvement, it will be seen, may be readily adapted to any of the machines in common use without the exercise of any inventive faculty.

E E E E, &c., in the several drawings represent the frame-work of the machine, which should be constructed in the ordinary way, either with wood or iron.

F is the planing-cylinder, the journals of which have proper bearings at *a a*, the said cylinder being revolved by means of a band passing from a pulley, *c*, Fig. 4, on one journal of said cylinder to the driving drum or shaft *d d*, the journals of which rest and revolve in proper bearings in the frame-work E E E.

The feed-rollers *e f e f*, Figs. 2 and 5, on each side of the cylinder, are arranged as in the Woodworth machines, the upper rollers, *e e*, serving as pressure-rollers to keep the plank or board to be planed from being drawn up by the action of the knives of the planing-cylinder. With this view the journals of the rollers *e e* rest and revolve in movable boxes *g g g g*, which are pressed down by means of the weighted levers *h h h h h h h h*, arranged as shown in Fig. 2. The lower rollers, *f f*, are driven by means of cogged wheels *i i*, (on one of their journals,) which are connected to a revolving shaft, *k*, by means of the cogged pinions *l l l*, the arrangement of which will be understood by inspection of Fig. 2, the center pinion, *l*, of the three being on the end of the shaft *k*, said shaft being revolved by a band from the driving-drum.

*m m n n* are two longitudinal stationary guides having perfectly straight edges, and fastened to the transverse bed-pieces *o o o o o o*, &c., Fig. 2, placed at proper intervals from the front to rear of the machine, and also to the bed-piece *p p*, Figs. 2, 4, 5, directly under the planing-cylinder. These guides are for directing the edge of the board which has not been made straight before its introduction to the machine, that denoted by *n n* being placed a little nearer to a center line drawn longitudinally through the machine than that at *m m*, the edges of the two guides regulating the quantity to be cut from the edge of the board by the grooving-tool to make the same straight, as in the machines in common use.

The revolving grooving-tool *q*, Figs. 2 and 4, is arranged, in the ordinary way, on the top of a vertical shaft, *r*, the journals of which have stationary bearings, and said shaft being revolved by a belt from the driving-drum. The revolving tonguing-tool *s* is also arranged on the top of a vertical shaft, *t*, which shaft turns in bearings which are arranged to slide laterally, as follows:

The foot of the shaft *t* rests and turns in a proper step in the horizontal sliding piece *u*, Figs. 1, 4, and 5, said piece being connected to the bar *y*, and through the medium of said bar to the upper bearing-block, *v*, of the shaft by the vertical bar *w*. The bearing-block *v* slides laterally on the rail *x*, Fig. 2, which rail *x* is in front of and attached to the bed-piece *p p*. A bar, *y*, Fig. 5, fitted to slide underneath the bed-piece *p p*, extends longitudinally under the bed-piece *p p* to a sliding block, *b'*, which moves on the rail *c'* on the front side of the bed-piece *p p*.

The adjustable guide-bar *d'*, Figs. 2 and 5, of the tapering or wedging shape shown in Fig. 2, is firmly connected to the top of the movable bearing-block *v* and sliding block *b'*, and this bar *d'* comes up and bears against the straight edge of the board to be planed, &c., all of the parts above described as connected with the tonguing-tool, &c., moving together laterally, as will be readily understood without further explanation.

Figure 6:
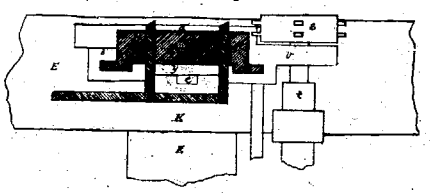

The above-described arrangement will be seen more clearly and on a larger scale in Fig. 6.

The arrangement of mechanical devices for rendering the guide-bar *d* and tonguing-tool *s* adjustable is all that remains to be described of my improved apparatus. It is as follows: A rack-bar, *e'*, is secured at one end to the bar *y*, which is connected to the guide-bar *d'*, as hereinabove set forth, the said rack-bar extending through proper slots in the frame-work to one side of the machine, as shown in Figs. 2 and 4. A cogged pinion, *f'*, Figs. 1 and 4, engages with the teeth of the rack-bar *e'*, and is firmly fixed on one end of a long shaft, *g' g'*, which extends to the rear of the machine, as shown in Fig. 2, having proper bearings on the side of the frame-work E E. On the rear end of this shaft is a pulley, *h'*, Figs. 1, 2, 3, having one end of a cord or band attached to its periphery, the other end of which cord suspends a heavy weight, *l'*, Figs. 1 and 2. This weight thus arranged, it will be seen, when left free to act, will cause the shaft *g' g'* and pinion *f'* to turn and move the rack-bar *e'* and guide-bar *d'* laterally until the inner side of the latter comes in contact with the straight edge of the board to be operated upon, against which the weight will keep it; and it will also be seen that if the board be of a tapering or wedge shape it will counteract the effect of the weight and press the guide-bar *d'* outward, (if the smaller end of the board be presented first to the machine,) so that the grooving-wheel will work without reducing the width of the board.

When the board has passed entirely by the cutter, the weight, &c., is prevented from pressing the guide-bar *d'* farther inward by the following arrangement of machinery: A ratchet-wheel, *k'*, Figs. 1, 2, and 3, is arranged on the shaft *g' g'* in juxtaposition to the pulley *h'*, and a pawl or series of pawls, *l'*, is arranged on the end of the block *m'*, the end of which pawl engages with the teeth of the ratchet-wheel *k'*. The right-angular arm *n' n'* on one end of the turning-rod *o' o'* is arranged under the pawl *l'*. The rod *o' o'* has suitable bearings attached to the under side of the transverse bed-pieces *o o o o*, and extends along nearly to the edge of the bed-piece *p p*, where it has another right-angular arm, *p' p'*, (shown by dotted lines in Fig. 2,) which comes under the bed-piece *p p*, having a spring, *q'*, Fig. 2, which keeps it against the under side of the said bed-piece, or so that it will not act to throw the pawl *l'* out of connection with the ratchet-wheel *k'*, unless it is pressed down by the vertical sliding bolts *r' s'*, Figs. 2 and 5. These bolts are shaped on their upper ends like the common beveled bolts of a door-lock, and move up and down in slots in the bed-piece *p p*, the bottoms resting on the top of the arm *p' p'*, or connected to the same. These bolts are arranged in a line with each other, and at some distance apart, the front one, *s'*, being as near as it can be to a line drawn through the points where the tonguing and grooving tools would strike the edges of the board, the object of which arrangement is as follows:

When the front end of the board comes in contact with the first bolt, *r'*, it depresses it, and consequently turns the rod *o' o'*, throws the pawl *l'* out of connection with the ratchet-wheel *k'*, and allows the weight *i'* to act, as hereinabove set forth, and carry the guide-bar *d'* against the edge of the board or plank. The under side of the board, it will be seen, as it passes over the bolts *r' s'*, keeps them down, and keeps the pawl *l'* out of connection with the ratchet-wheel *k'*, leaving the guide-bar *d'* and tonguing-tool *s* free to move as the edges of the board may press them until the rear of the board escapes from the front bolt, *s'*, when the pawl is left free to engage with the teeth of the wheel. The necessity of the second bolt will be apparent, when it is stated that if there were but one bolt, when the end of the board lifts it after passing in the direction indicated by the red arrows in Fig. 2, that portion of the board which remained to be grooved, &c., would, if it were tapering, be cut or torn at the angular part, as it is requisite that the first bolt, *r'*, should be placed at some distance in rear of the tonguing-tool, in order to give the guide-bar *d'* time to advance to the edge of the board, after the pawl $l'$ has been thrown out from the ratchet-wheel $k'$, before the said tool begins to act.

It will be evident that the tonguing or grooving tool may be made adjustable, as above described.

Having thus described my improvement, I shall state my claims, as follows:

What I claim as my invention, and desire to have secured to me by Letters Patent, is—

1. Giving a lateral movement to either of the edge-cutters, by any suitable arrangement of mechanical devices, while the board is being fed through the machine, so as to adapt the edge-cutter to any taper of the board.

2. Arranging the box or bearing of the shaft of either of the edge-cutters so as to slide laterally on a rail, and connecting said box or bearing to a sliding guide-bar, $d'$, which bar is governed or regulated in its movements by the edge of the board, and kept up against said edge by means of a weight operating on it (so as to press it laterally) through the medium of a rack and pinion, as hereinbefore set forth, the mechanical arrangement and operation being substantially as hereinabove specified.

3. The combination of the sliding bolts $r'$ $s'$ with the turning-rod $o'$ $o'$, (having right-angular arms $n''$ $n'$ $p'$ $p'$,) and pawl $l'$ and ratchet-wheel $k'$ on the end of the shaft, which the weight $i'$ turns or revolves, said combination being arranged substantially as hereinbefore set forth, and for the purpose of permitting or checking the operation of said weight $i'$ upon the sliding guide-bar $d'$, as hereinbefore specified.

CHARLES W. BROWN.

Witnesses:

JOSEPH GAVETT,

SAMUEL N. PIPER.